(12) United States Patent
Yoshimuta

(10) Patent No.: US 9,304,019 B2
(45) Date of Patent: Apr. 5, 2016

(54) ROTATION DETECTION APPARATUS, MOTOR CONTROL APPARATUS, MOTOR DRIVEN APPARATUS, METHOD OF CORRECTING ROTATION DETECTION APPARATUS, AND NON-TRANSITORY COMPUTER-READABLE STORAGE MEDIUM STORING CORRECTION PROGRAM

(71) Applicant: CANON KABUSHIKI KAISHA, Tokyo (JP)

(72) Inventor: Junki Yoshimuta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 14/334,273

(22) Filed: Jul. 17, 2014

(65) Prior Publication Data
US 2015/0022911 A1 Jan. 22, 2015

(30) Foreign Application Priority Data
Jul. 19, 2013 (JP) ................................. 2013-149987

(51) Int. Cl.
| G02B 7/02 | (2006.01) |
|---|---|
| G01D 18/00 | (2006.01) |
| G01D 5/12 | (2006.01) |
| G01D 5/34 | (2006.01) |
| G02B 7/04 | (2006.01) |
| G05B 1/03 | (2006.01) |
| G01D 3/02 | (2006.01) |
| G01D 5/14 | (2006.01) |
| G01D 5/244 | (2006.01) |
| G02B 7/10 | (2006.01) |
| G02B 7/28 | (2006.01) |
| G02B 7/36 | (2006.01) |

(52) U.S. Cl.
CPC ............... *G01D 18/00* (2013.01); *G01D 3/022* (2013.01); *G01D 5/12* (2013.01); *G01D 5/145* (2013.01); *G01D 5/2449* (2013.01); *G01D 5/34* (2013.01); *G02B 7/04* (2013.01); *G02B 7/10* (2013.01); *G02B 7/102* (2013.01); *G02B 7/28* (2013.01); *G05B 1/03* (2013.01); *G02B 7/365* (2013.01); *G05B 2219/45178* (2013.01)

(58) Field of Classification Search
CPC ....................................................... G02B 7/08
USPC ......................................................... 359/824
See application file for complete search history.

(56) References Cited

U.S. PATENT DOCUMENTS

2008/0199170 A1* 8/2008 Shibuno ................. G03B 13/36
396/125

FOREIGN PATENT DOCUMENTS

JP 10-229691 A 8/1998

*Primary Examiner* — James Jones
(74) *Attorney, Agent, or Firm* — Rossi, Kimms & McDowell LLP

(57) ABSTRACT

The rotation detection apparatus includes a rotatable member rotatable with rotation of a motor and having multiple pattern element portions in its rotational direction, a signal outputter to output a detection signal changing in response to rotation of the pattern element portions, and a memory storing correction values each provided for each of the pattern element portions and used to perform correction of an error in a relation between rotational positions of the rotatable member and the change of the detection signal. A corrector performs the correction with reference to a reference position of the rotatable member in an origin state where a driven member driven by the motor is located at its origin position and by using each of the correction values for each change of the detection signal when the rotatable member is rotated from the reference position.

12 Claims, 10 Drawing Sheets

ROTATION DETECTION APPARATUS, MOTOR CONTROL APPARATUS, MOTOR DRIVEN APPARATUS, METHOD OF CORRECTING ROTATION DETECTION APPARATUS, AND NON-TRANSITORY COMPUTER-READABLE STORAGE MEDIUM STORING CORRECTION PROGRAM

BACKGROUND OF THE INVENTION

1. Field of the Invention

The present invention relates to a rotation detection apparatus, which is also referred to as "a rotary encoder", and particularly to a rotation detection apparatus used for control of a motor.

2. Description of the Related Art

Accurate control of a rotational amount or speed of a motor is made by a feedback control that feeds back an actual rotational amount or speed detected by a rotary encoder and controls the motor so that the detected rotational amount or speed becomes closer to a target rotational amount or speed. The rotary encoder includes a rotatable member that rotates with rotation of the motor, and a sensor that magnetically or optically detects a pattern for rotation detection (rotation detection pattern) provided to the rotatable member.

The rotation detection pattern is formed by multiple pattern element portions which are S- and N-pole magnetized portions or light-transmissive/reflective and non-light-transmissive/reflective portions) arranged in a rotational direction of the rotatable member. Arranging these pattern element portions accurately at designed positions on the rotatable member enables an accurate detection of the rotational amount or speed of the motor. However, a manufacturing error in the rotatable member often shifts the arrangement of the pattern element portions from their designed positions, which is called an arrangement error.

Japanese Patent Laid-open No. 10-229691 discloses, in order to remove influence of an error in a magnetization pitch in a driving magnet of a motor, a method acquiring a period from an edge interval between a change edge of an encoder output to another change edge temporally precedent thereto by a predetermined number of edges and calculating a rotational speed on a basis of the period.

However, the method disclosed in Japanese Patent Laid-open No. 10-229691 calculates the rotational speed without using neighboring pattern element portions, which degrades a detection resolution of the rotational speed and thereby disables detection of a minute oscillation of the rotational speed.

SUMMARY OF THE INVENTION

The present invention provides a rotation detection apparatus capable of, when any arrangement error is present in pattern element portions forming a rotation detection pattern, detecting rotation of a motor with high accuracy, and provides a motor control apparatus and a motor driven apparatus each including the rotation detection apparatus.

The present invention provides as an aspect thereof a rotation detection apparatus including a rotatable member rotatable with rotation of a motor and provided in its rotational direction with multiple pattern element portions forming a pattern for rotation detection, a signal outputter configured to output a detection signal changing in response to rotation of the pattern element portions with rotation of the rotatable member, a memory storing multiple correction values each provided for each of the pattern element portions and used to perform correction of an error in a relation between rotational positions of the rotatable member and the change of the detection signal, the error being caused by an arrangement error of the pattern element portions on the rotatable member, and a corrector configured to perform the correction with reference to a reference position that is one rotational position of the rotatable member in an origin state where a driven member driven by the motor is located at its origin position, and by using each of the correction values for each change of the detection signal when the rotatable member is rotated from the reference position.

The present invention provides as another aspect thereof a motor control apparatus including the above rotation detection apparatus, and a controller configured to control drive of the motor by using the detection signal after being corrected by the corrector.

The present invention provides as yet another aspect thereof a motor driven apparatus including a motor, a driven member to be driven by the motor, an origin detector configured to detect an origin position of the driven member, and the above motor control apparatus.

The present invention provides as still another aspect thereof a method of correcting a rotation detection apparatus, the apparatus includes a rotatable member rotatable with rotation of a motor and provided in its rotational direction with multiple pattern element portions forming a pattern for rotation detection. The method includes providing multiple correction values each provided for each of the pattern element portions, and performing, by using the correction values, correction of an error in a relation between rotational positions of the rotatable member and change of a detection signal which is output and changes in response to rotation of the pattern element portions with rotation of the rotatable member, the error being caused by an arrangement error of the pattern element portions on the rotatable member. The method performs the correction with reference to a reference position that is one rotational position of the rotatable member in an origin state where a driven member driven by the motor is located at its origin position, and by using each of the correction values for each change of the detection signal when the rotatable member is rotated from the reference position.

The present invention provides as yet still another aspect thereof a non-transitory computer-readable storage medium storing a correction program as a computer program to cause a computer provided in a rotation detection apparatus to perform a correction process by the above method of correcting the rotation detection apparatus.

Other aspects of the present invention will become apparent from the following description and the attached drawings.

DESCRIPTION OF THE EMBODIMENTS

Exemplary embodiments of the present invention will be described below in detail with reference to the accompanied drawings.

Figure 1:
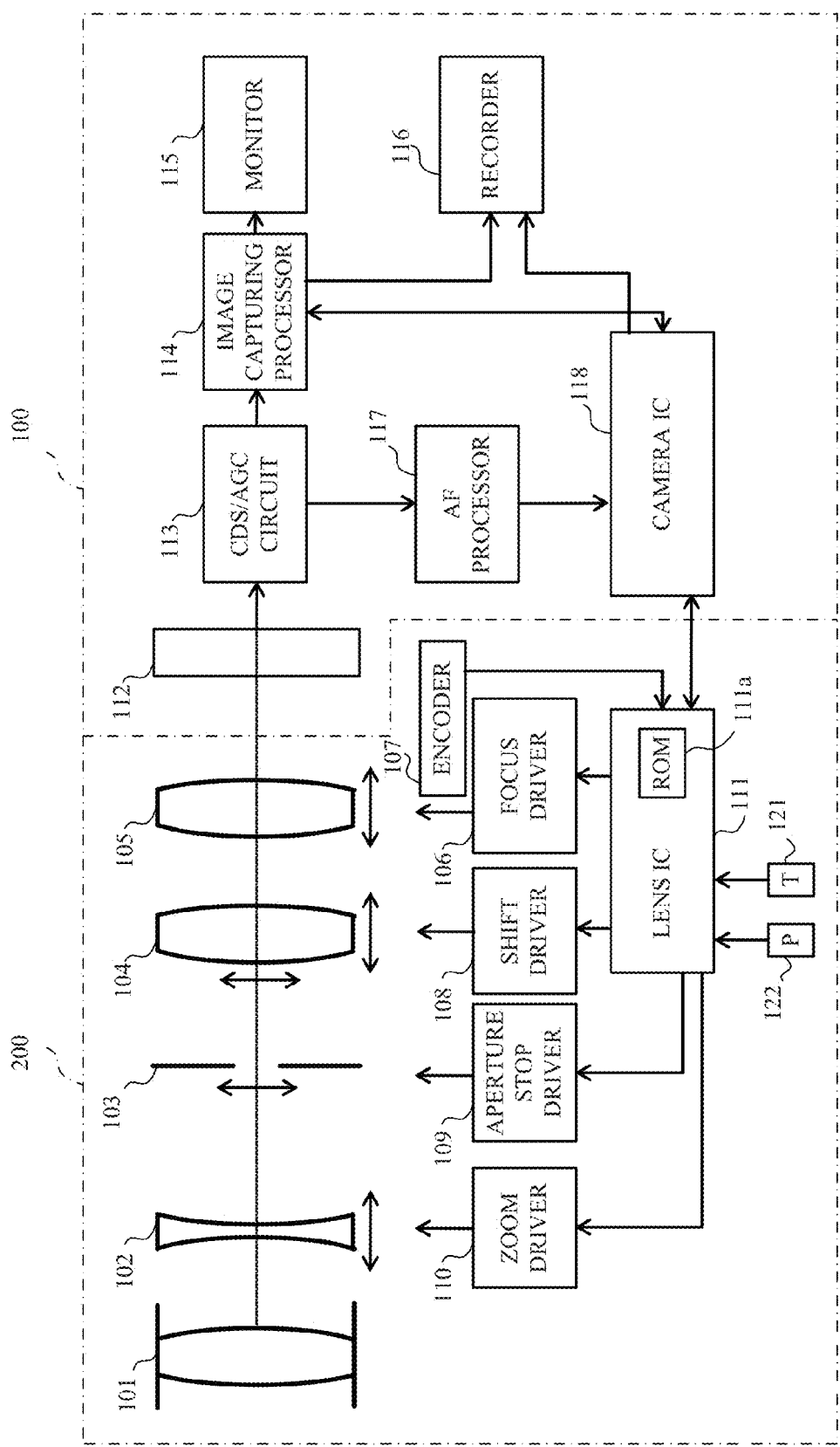
FIG. 1 is a block diagram illustrating a configuration of a digital single-lens reflex camera system including a magnetic rotary encoder that is an embodiment of the present invention.

FIG. 1 illustrates a configuration of an interchangeable lens 200 as a motor driven apparatus including a magnetic rotary encoder that is an embodiment of the present invention. FIG. 1 also illustrates a configuration of a digital single-lens reflex camera 100 as an image pickup apparatus to which the interchangeable lens 200 is detachably attached. The image pickup apparatus may be a digital still camera, a digital video camera, a lens-integrated camera or a microscope.

The interchangeable lens 200 includes an image capturing optical system constituted by, in order from an object side, a fixed lens 101, a zoom lens 102, an aperture stop 103, an image-stabilizing lens 104 and a focus lens (optical element) 105. The zoom lens 102 is moved in a direction of an optical axis (hereinafter referred to as "an optical axis direction") to perform variation of magnification. The focus lens 105 is moved in the optical axis direction to perform focusing. The aperture stop 103 changes its aperture diameter to control amount of light passing therethrough. The image-stabilizing lens 104 is moved (shifted) in a direction orthogonal to the optical axis to reduce (correct) image blur caused by camera shaking due to hand jiggling.

The interchangeable lens 200 further includes a zoom driver 110 that drives the zoom lens 102, an aperture stop driver 109 that drives the aperture stop 103, a shift driver 108 that drives the image-stabilizing lens 104, and a focus driver 106 that drives the focus lens 105. The drivers each include an actuator such as a motor serving as a driving source. The drivers are each controlled by a lens IC 111 provided in the interchangeable lens 200 and serving as a lens controller.

In response to a user's operation of a zoom ring (not illustrated) provided to the interchangeable lens 200, the lens IC 111 drives the zoom lens 102 via the zoom driver 110 depending on an amount of the operation. The zoom lens 102 has its position electrically detected. On a basis of the detected position, the lens IC 111 calculates, in order to maintain an in-focus state, a drive direction and a drive amount of the focus lens 105. Then, the lens IC 111 supplies a zoom tracking drive command indicating the drive direction and amount to the focus driver 106. In response to a user's operation of a manual focus ring (not illustrated) provided to the interchangeable lens 200, the lens IC 111 calculates a drive amount of the focus lens 105 on a basis of an amount of the operation. Then, the lens IC 111 supplies a manual focus drive command indicating the drive amount to the focus driver 106. Alternatively, the lens IC 111 receives an autofocus (AF) drive command from a camera IC 118 as described later and moves the focus lens 105 via the focus driver 106 to perform AF.

The lens IC 111 receives, from the camera IC 118, a stop driving instruction based on a photometry result and drives the aperture stop 103 via the aperture stop driver 109. In addition, on a basis of lens shaking (that is, the camera shaking) due to the hand jiggling detected by a shake sensor 122 such as a gyro sensor provided to the interchangeable lens 200 (or to the camera 100), the lens IC 111 shifts the shift lens 104 via the shift driver 108.

On the other hand, in FIG. 1, the camera 100 includes an image sensor 112 as a photoelectric conversion element constituted by a CMOS sensor or a CCD sensor, a CDS/AGC circuit 113 that samples output of the image sensor 112 and performs gain control, and an image capturing processor 114. The image capturing processor 114 performs, in response to a command from the camera IC 118 as a camera controller, various image processes on an output signal from the CDS/AGC circuit 113 to produce an image (image data). The produced image is displayed on a monitor 115 and recorded by a recorder 116 to a recording medium such as a semiconductor memory (not illustrated).

The camera 100 further includes an AF processor 117. The AF processor 117 extracts, from output signals of pixels used for focus detection among output signals of all pixels from the CDS/AGC circuit 113, a high-frequency component or a luminance difference component to produce an AF evaluation signal therefrom. The camera IC 118 searches for a position (in-focus position) of the focus lens 105 at which a value of the AF evaluation signal (AF evaluation value) becomes maximum. Then, in order to move the focus lens 105 to the in-focus position, the camera IC 118 outputs a focus drive command to the lens IC 111. On a basis of the focus drive command, the lens IC 111 controls energization of excitation coils of a motor (stepping motor) 106a through the focus driver 106. This energization control enables control of drive of the motor 106a and a rotational speed (acceleration, constant speed and deceleration) thereof, and thus enables control of movement of the focus lens 105 and a movement speed thereof. In this manner, autofocus (AF) control is performed.

Figure 2:
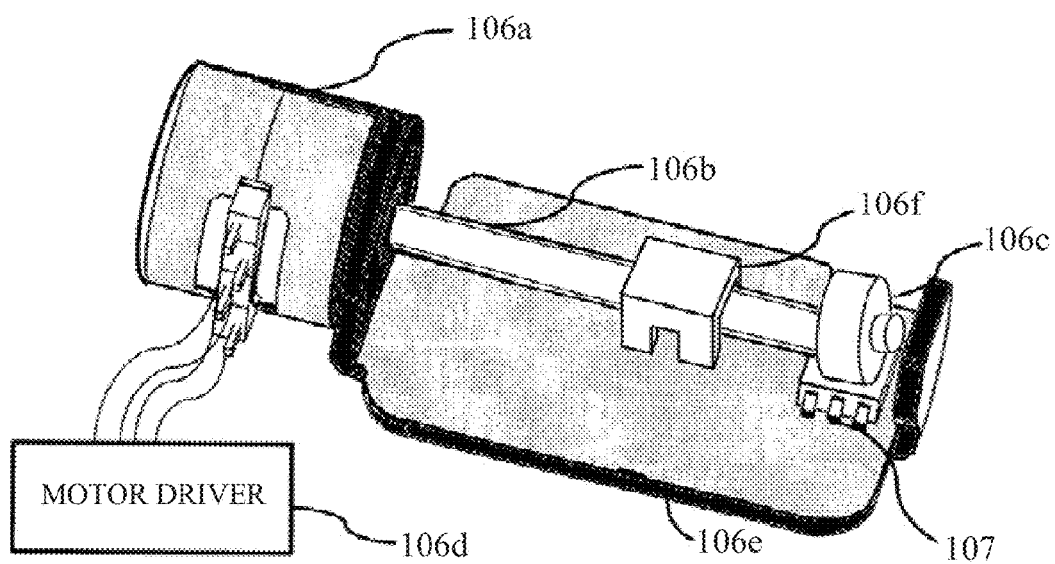
FIG. 2 is a perspective diagram illustrating a focus motor unit including a stepping motor in the embodiment.
Figure 3:
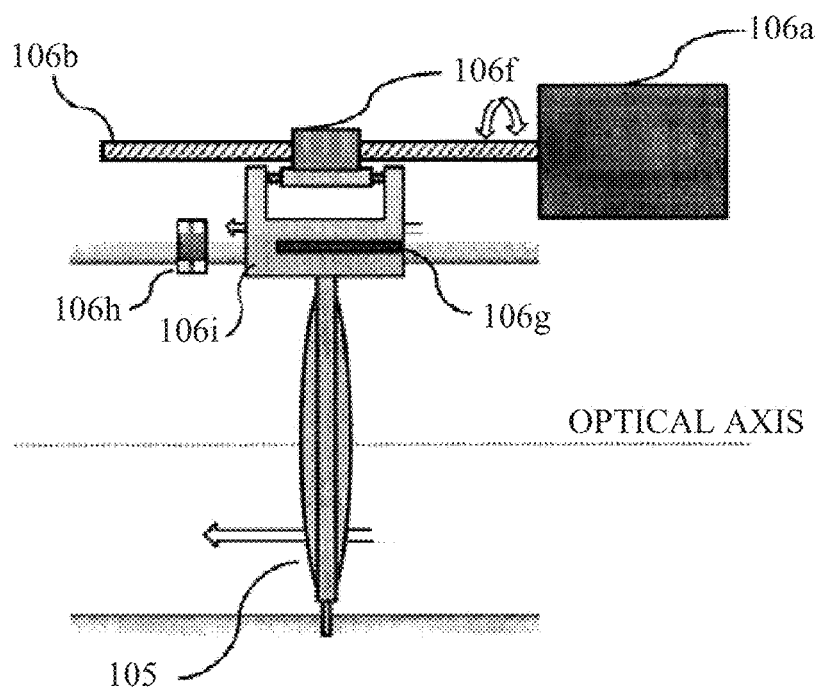
FIG. 3 is a perspective diagram of a mechanism to detect an origin position of a focus lens in the embodiment.

FIGS. 2 and 3 illustrate a configuration of a focus motor unit included in the focus driver 106. The focus motor unit includes the stepping motor 106a as a brushless motor and a lead screw 106b that is an output shaft of the motor 106a. The stepping motor 106a and the lead screw 106b are held by a motor holder 106e. The brushless motor is not limited to a stepping motor and may be a reluctance motor or any other brushless motor.

The focus motor unit further includes an encoder magnet 106c attached to an end of the lead screw 106b and serving as a rotatable member that rotates integrally with the lead screw 106b. The focus motor unit further includes a Hall IC (magnetic detection element) 107 serving as a signal outputter held by the motor holder 106e. The encoder magnet 106c is constituted by a cylindrical permanent magnet similarly to a magnet rotor (not illustrated) provided inside the motor 106a. The encoder magnet 106c has, on an outer periphery thereof, N (north)-pole magnetized portions and S (south)-pole magnetized portions. The N- and S-pole magnetized portions serve as pattern element portions; the N-pole magnetized portion and the S-pole magnetized portion are alternately arranged in a rotational direction of the encoder magnet 106c. The N-pole and S-pole magnetized portions thus alternately arranged form a pattern for rotation detection (rotation detection pattern). The total number of the N- and S-pole magnetized portions in the encoder magnet 106c (10 poles in the present embodiment) is equal to the number of magnetized portions in the magnet rotor.

The Hall IC 107 generates, in response to change in a magnetic flux density (magnetic field) due to rotation of the encoder magnet 106c, two-phase electrical signals indicating rotation of the stepping motor 106a. The two-phase electrical signals are alternating signals having two mutually different phases. The Hall IC 107 converts each of the two-phase electrical signals (alternating signals) into a binary digital signal (pulse signal) whose output value alternates between a "High" level and a "Low" level. The High and Low levels depend on whether or not a value of the alternating signal exceeds a predetermined value (that is, whether or not the Hall IC 107 receives a magnetic field having an intensity exceeding a predetermined intensity). Then, the Hall IC 107 outputs two-phase binary signals (detection signals) each alternately including a rising edge (change from Low to High) and a falling edge (change from High to Low). The encoder magnet 106c, the Hall IC 107 and the lens IC 111 that serves as a corrector to correct the output (two-phase binary signals) from the Hall IC 107 as described later constitute the magnetic rotary encoder as a rotation detection apparatus. This encoder and the lens IC 111 that controls drive of the focus lens 105 on a basis of the corrected output from the encoder constitute a motor control apparatus.

The rotary encoder is not limited to a digital encoder that outputs a binary signal as in the present embodiment, and may be an analog encoder that outputs a sinusoidal signal.

The focus motor unit further includes a motor driver 106d that energizes the excitation coils (not illustrated) of the motor 106a, and a rack 106f engaging with the lead screw 106b. As illustrated in FIG. 3, the rack 106f is attached to the focus lens 105 (to be precise, to a focus lens holding frame 106i serving as a member holding the focus lens 105). With this configuration, rotation of the motor 106a and hence rotation of the lead screw 106bc drives the focus lens 105 via the rack 106f in the optical axis direction in which the lead screw 106b extends.

FIG. 3 also illustrates an origin detection mechanism provided in the focus motor unit. The focus lens 105 is movable in the optical axis direction within a predetermined drive range. The focus lens holding frame 106i includes a light-shielding wall portion 106g formed therein. The interchangeable lens 200 includes a barrel body (not illustrated) to which a photo-interrupter 106h is fixed at a position corresponding to an origin position of the focus lens 105 which is a reference position for detection of position of the focus lens 105.

The photo-interrupter 106h is constituted by a light-emitting element and a light-receiving element that are installed facing each other. In a state (light-transmissive state) where the light-shielding wall portion 106g, which is moved with the focus lens 105, does not enter between the light-emitting element and the light-receiving element, light from the light-emitting element is received by the light-receiving element, which causes the light-receiving element to output a signal at a "High" level. In contrast, in a state (light-shielding state) where the light-shielding wall portion 106g enters therebetween to shield the light from being received by the light-receiving element, the light-receiving element outputs the signal at a "Low" level. This switching from the High level to the Low level of the signal from the light-receiving element enables detecting that the focus lens 105 is located at the origin position, which is referred to as "an origin state".

Next, description will be made of correction information to be used for correction of the two-phase detection signals (binary signals) output from the Hall IC (hereinafter also referred to as "an encoder") 107 in the present embodiment. The correction information contains a correction value applied to each edge of the two-phase detection signals (hereinafter each also referred to as "an encoder output") output from the encoder 107, a combination (hereinafter also referred to as "an encoder output pattern") of the two-phase encoder outputs in the origin state, and temperature information at a time of acquiring the correction information. Although description will be made later of the encoder output pattern in the origin state and the temperature at the time of acquiring the correction information, following description will be made of the correction value applied to each edge of the encoder outputs.

Figure 4:
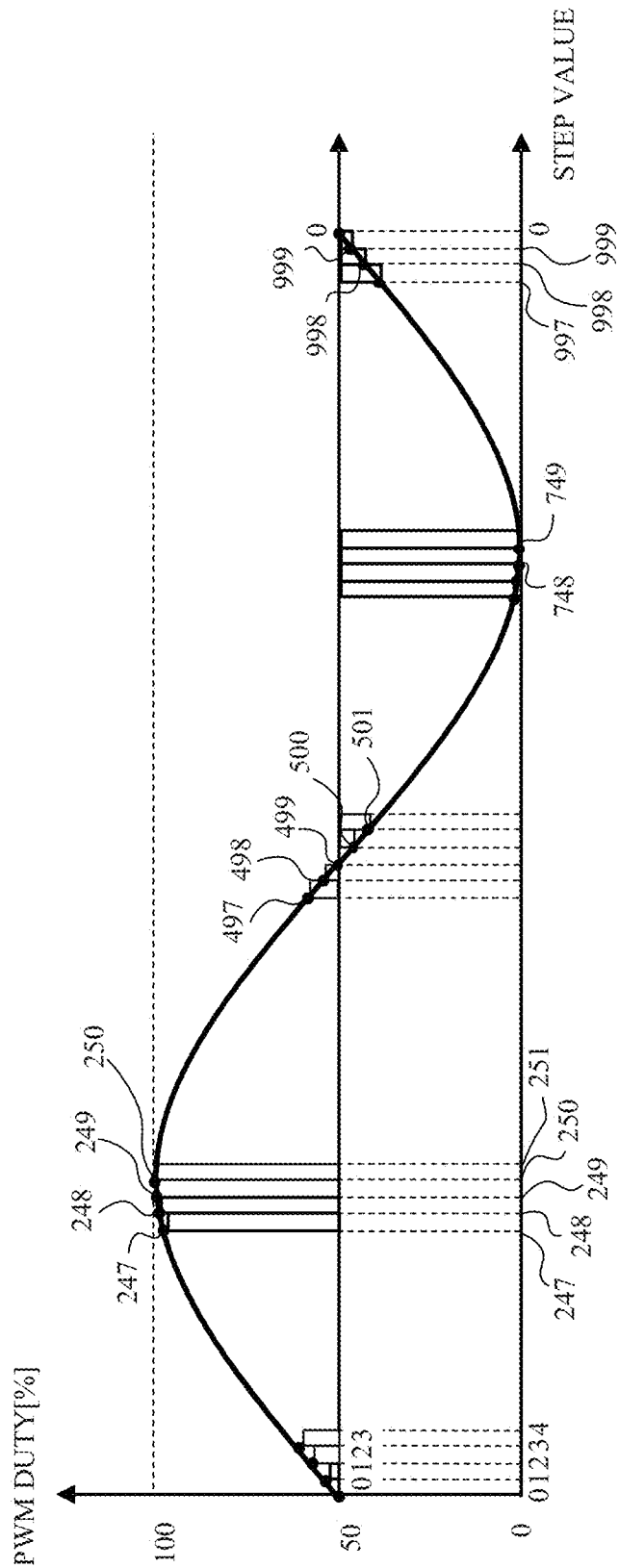
FIG. 4 is a graph illustrating a relation of an excitation waveform of the stepping motor and step values thereof in the embodiment.

FIG. 4 illustrates a voltage waveform (hereinafter simply referred to as "an excitation waveform") of an excitation signal (excitation voltage) applied to each excitation coil of the motor 106a by the motor driver 106d in response to the focus drive command from the lens IC 111. In the present embodiment, a PWM control is used, which keeps an input voltage constant in amplitude while modulating a pulse width, to produce a sinusoidal excitation waveform. In addition, in the present embodiment, as illustrated in FIG. 4, dividing one period of the sinusoidal excitation waveform into 1000 steps and producing a predetermined PWM ratio at each step enables sinusoidal drive of the motor 106a.

Figure 5:
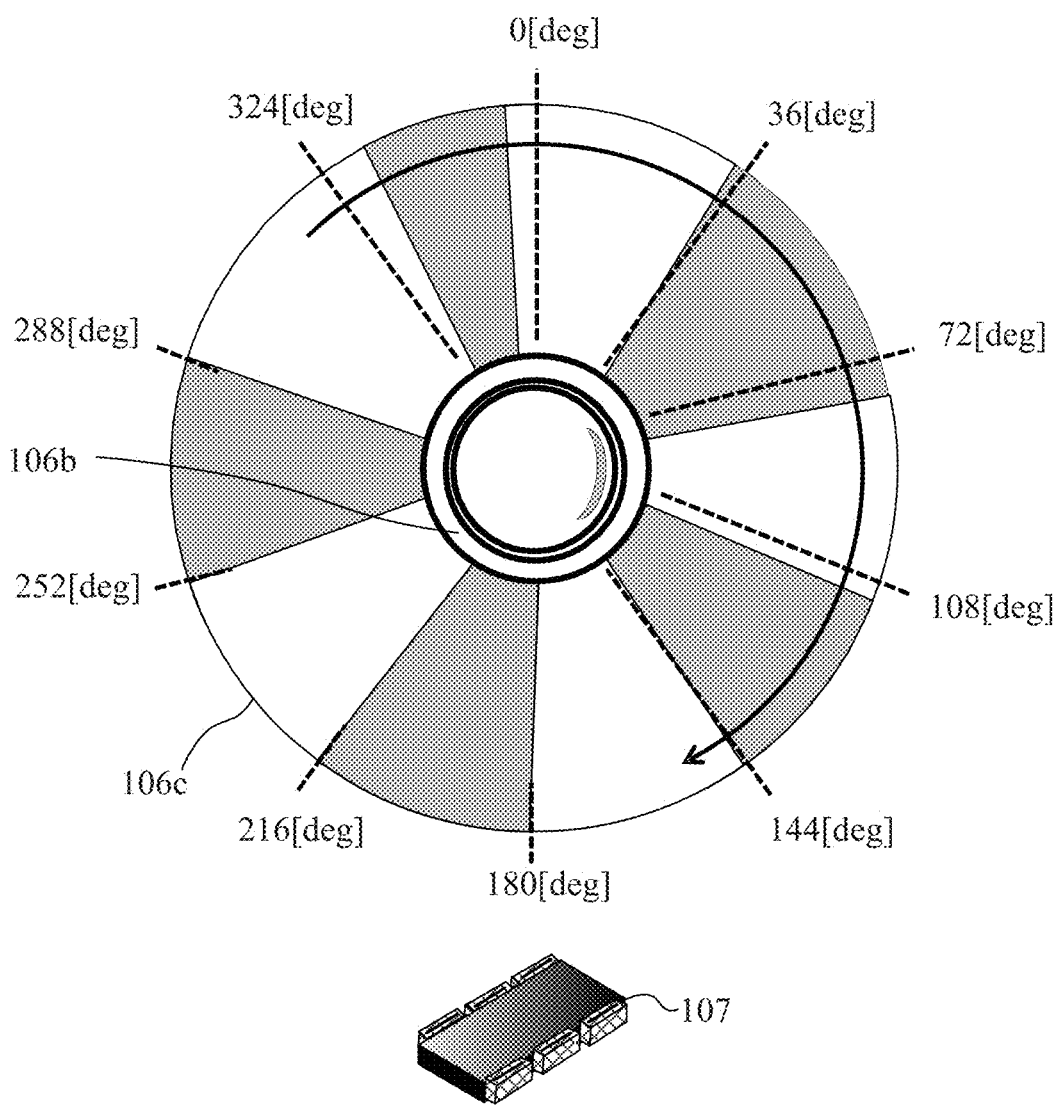
FIG. 5 is a diagram illustrating errors in a magnetization pitch of an encoder magnet in the embodiment.

FIG. 5 illustrates an arrangement of the magnetized portions of the encoder magnet 106c. As described above, the encoder magnet 106c is provided with, on its outer periphery, the magnetized portions of 10 poles in the rotational direction. These magnetized portions of 10 poles are desirable to be uniformly magnetized. However, in reality, a process of magnetization involves a misalignment of a yoke used for the magnetization and a manufacturing error caused by simultaneous magnetization for multiple encoder magnets. Such a yoke misalignment and a manufacturing error result in ununiform magnetization of the magnetized portions of 10 poles in the individual encoder magnet 106c and further cause difference (variation) among magnetized states of the encoder magnets.

The magnetized portions of 10 poles could form, if uniformly magnetized, magnetized portions arranged with an equal pitch therebetween and respectively located at 36 degree, 72 degree, 108 degree, 144 degree, 180 degree, 216 degree, 252 degree, 288 degree and 324 degree as illustrated in FIG. 5, and poles thereof change alternately. However, the manufacturing error causes an arrangement error (hereinafter also referred to as "a magnetization pitch offset") in any of the magnetized portions. The present embodiment calculates an angular speed of the motor 106a from the encoder outputs, calculates its difference from a target speed and performs a feedback control on the motor 106a so as to decrease the difference to 0. In this configuration, the magnetization pitch offset of the encoder magnet 106c directly affects the calculated angular speed and degrades accuracy of the calculation. Thus, a highly accurate feedback control requires removal of an error component due to the magnetization pitch offset from the encoder outputs. To meet this requirement, the present embodiment applies a correction value described below to each edge of the encoder outputs and removes the error component due to the magnetization pitch offset from the encoder outputs. The correction value is the correction information for performing correction of an error due to the arrangement error of the magnetized portions of the encoder magnet 106c in a relation between a rotational position of the encoder magnet 106c and corresponding edges of the encoder outputs.

In the present embodiment, the lens IC 111 as the corrector calculates (provides) the correction value from a step value (0 to 999) of the excitation voltage of the motor 106a corresponding to each edge (change timing) of each of the encoder outputs. The magnetized portions of 10 poles in the encoder magnet 106c could give, if uniformly magnetized, a unique step value of the excitation voltage at each change timing of the encoder output during constant-speed rotation, for each of the N pole and the S pole. Therefore, the lens IC 111 sets the correction value to the encoder magnet 106c having the magnetization pitch offset so that the step value of the excitation voltage at each change timing of the encoder output during the constant-speed rotation may become a unique value. The lens IC 111 needs to store, along with this setting, which correction value corresponds to which rotational position.

Specifically, while rotating the motor 106a at a constant speed, the lens IC 111 sets a step value of the excitation voltage at an arbitrary change timing of the encoder output as a reference value and sets the correction value so that the step value at a next change timing of the encoder output has a difference of 500 from the reference value. Then, the lens IC 111 sets the correction value so that the step value of the excitation voltage at another next change timing becomes the same as the reference value. The lens IC 111 repeats this calculation of the correction value for each of all the magnetized portions of 10 poles in the encoder magnet 106c to produce 10 correction values for the encoder output of each phase. The reference value is not necessarily identical to a step value of the excitation voltage at a change timing of the encoder output at the origin position of the focus lens 105.

In the present embodiment, in consideration of a difference in the error component depending on the rotational direction of the encoder magnet 106c, the lens IC 111 produces the correction values for a positive rotational direction and a negative rotational direction. The positive rotational direction corresponds to, for example, a direction (hereinafter referred to as "a close direction") of driving the focus lens 105 so as to focus on a closer distance object. The negative rotational direction corresponds to a direction (hereinafter referred to as "an infinity direction") of driving the focus lens 105 so as to focus on a more infinite object. In this manner, the lens IC 111 produces 20 correction values for the 10 poles for both the positive and negative rotational directions for the encoder output of each phase, thereby providing a total of 40 correction values as the correction information. The lens IC 111 stores these 40 correction values in a ROM (storage unit) 111a provided therein.

Then, the lens IC 111 reads out, when starting the drive of the motor 106a, one correction value corresponding to the rotational direction and rotational position of the encoder magnet 106c and to the phase of the encoder output from the ROM 111a and then corrects the encoder output. Content of the correction value and its production method may be different from those described in the present embodiment and may be any correction value applicable for each edge of the encoder output.

Figure 6:
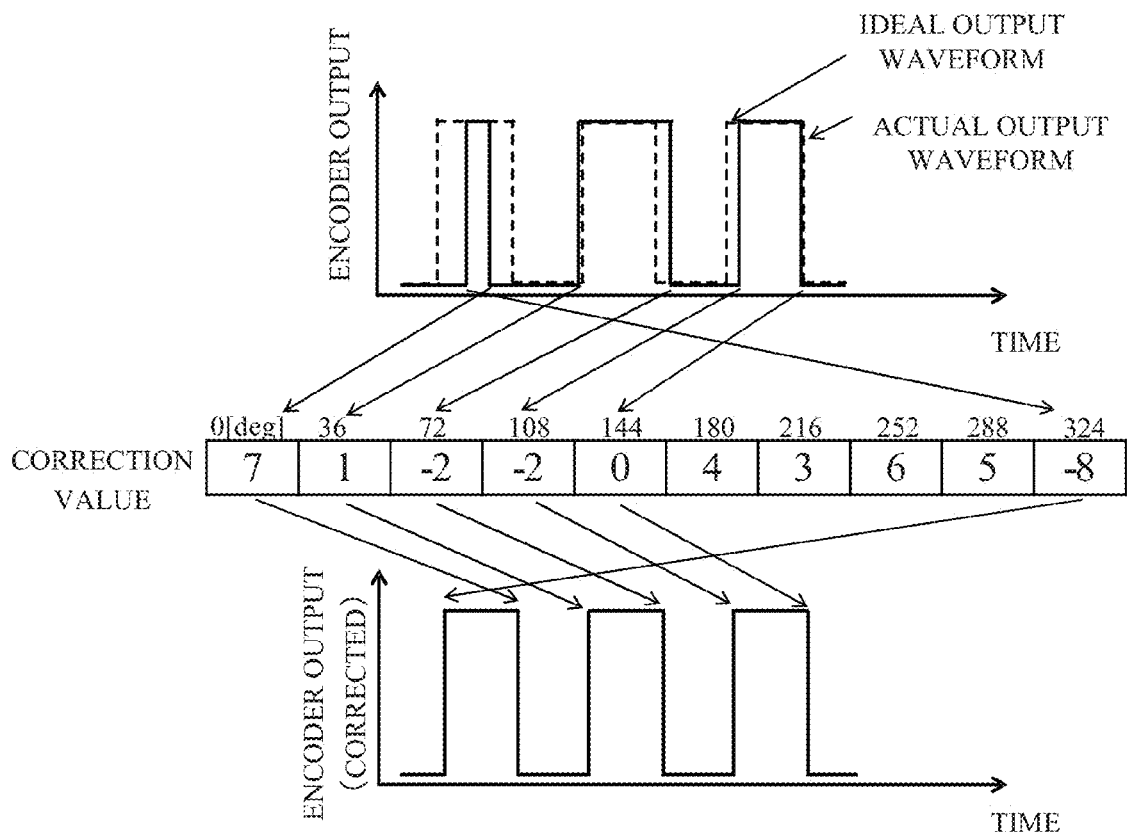
FIG. 6 is a diagram illustrating a relation between encoder outputs and correction values in the embodiment.

FIG. 6 illustrates an example of the correction for the encoder output. FIG. 6 illustrates, in its upper part, an exemplary waveform of an uncorrected encoder output (encoder output in an interval indicated by an arrow in FIG. 5) of the encoder magnet 106c, that is, of the motor 106a, rotating at a constant speed; a horizontal axis therein represents time and a vertical axis therein represents a value of the encoder output. FIG. 6 lists, in its middle part, a correction value array including exemplary correction values applied to 10 edges of one of the two-phase encoder outputs for rotation in a direction indicated by the arrow in FIG. 5. FIG. 6 further illustrates, in its lower part, an exemplary waveform of a corrected encoder output; a horizontal axis therein represents time and a vertical axis therein represents a value of the encoder output.

In the upper part of FIG. 6, a dashed line represents a waveform of the encoder output when an ideal encoder magnet having no magnetization pitch offset is used, and a solid line represents the waveform of the encoder output when the encoder magnet 106c having the magnetization pitch offset is used. The correction is a process to make the waveform of the encoder output represented by the solid line closer (desirably, identical) to the waveform of the encoder output represented by the dashed line.

A first edge of the encoder output corresponds to an output of the encoder magnet 106c at a rotational position of 324 degree, and thus a step value of −8 is applied as the correction value to the first edge. Although this correction value is a step value in a negative direction in time, the encoder output is only used for calculation of the angular speed of the motor 106a in the present embodiment, and therefore no problem arises.

A next edge of the encoder output corresponds to an output of the encoder magnet 106c at a rotational position of 0 degree, and thus a step value of 7 is applied as the correction value to the next edge. Similarly, to edges of the encoder magnet 106c at rotational positions of 36 degree, 72 degree and 108 degree, step values (correction values) corresponding to the edges are respectively applied. This process gives, as illustrated in the lower part of FIG. 6, a pseudo encoder output having a temporally equal interval in the lens IC 111.

After a rotational position (reference position) of the encoder magnet 106c corresponding to an edge of the encoder output to which one of the correction values in the correction value array is first applied is determined, subsequent ones in the correction value array can be sequentially applied for each edge appearing by the rotation of the encoder magnet 106c from the reference position. However, addition of information such as a marker for determining the rotational position to an arbitrary rotational position of the encoder magnet 106c may require additional members and processes. It is therefore desirable to set, without such addition of the information, the rotational position serving as the reference position.

For this reason, in the present embodiment, a rotational position of the encoder magnet 106c corresponding to the origin position of the focus lens 105, which is a driven member driven by the motor 106a, serves as the reference position, and the sequential application of the correction values in the correction value array starts with the correction value corresponding to the reference position. This is valid because a relation between the origin position and the rotational position of the encoder magnet 106c is uniquely determined. The number of edges of the encoder output from the reference position indicates a relative rotational position of the encoder magnet 106c with respect to the reference position.

On the other hand, the origin position of the focus lens 105 is detected by the origin detection mechanism illustrated in FIG. 3; the origin detection mechanism contains an error. In particular, the photo-interrupter 106h has a temperature-dependent property, and therefore the origin position thus detected, which is the reference position (rotational position) of the encoder magnet 106c corresponding to the origin position of the focus lens 105, needs to be corrected as well.

Figure 7:
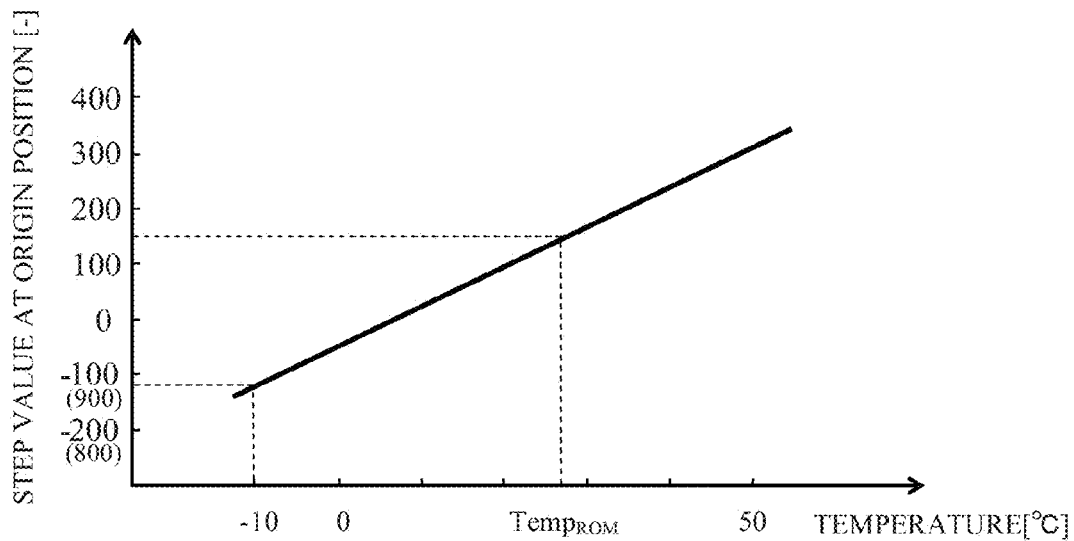
FIG. 7 is a graph illustrating change of the origin position of the focus lens due to temperature change in the embodiment.

FIG. 7 illustrates change of the step value of the excitation voltage corresponding to the origin position of the focus lens 105 due to change of temperature. In the figure, a horizontal axis represents the temperature, and a vertical axis represents the step value of the excitation voltage corresponding to the origin position. Although values below 0 on the vertical axis are expressed in negative values for convenience, a step value of −100 is equivalent to a step value of 900. For example, a temperature measured (detected) at a time of acquiring the temperature information is represented by $Temp_{ROM}$, and the step value of the excitation voltage corresponding to the origin position at that time is defined to be 160. In this case, when detection of the origin position is made at a temperature of −10° C., a step value of the excitation voltage is −120 (=880), which has a difference (shift) of 280 steps from the step value of 160 at the time of acquiring the correction information. This difference in step corresponds to a difference of 90 degrees or more in sinusoidal wave, which indicates that a different pole on the encoder magnet 106c from a pole thereon set as the reference position at the time of acquiring the correction information is observed.

In the present embodiment, as illustrated in FIG. 7, on a basis of the temperature-dependent property that the step value of the excitation voltage in the origin state monotonically increases as the temperature rises, the lens IC 111 estimates a shift amount of the reference position of the encoder magnet 106c in the origin state in response to a temperature change from the time of acquiring the correction information. Although in the present embodiment, as described below, the lens IC 111 estimates the shift amount of the reference position due to the temperature change by using change in the encoder output pattern, the shift amount of the reference position may be uniquely determined on the basis of the temperature-dependent property.

Figure 8:
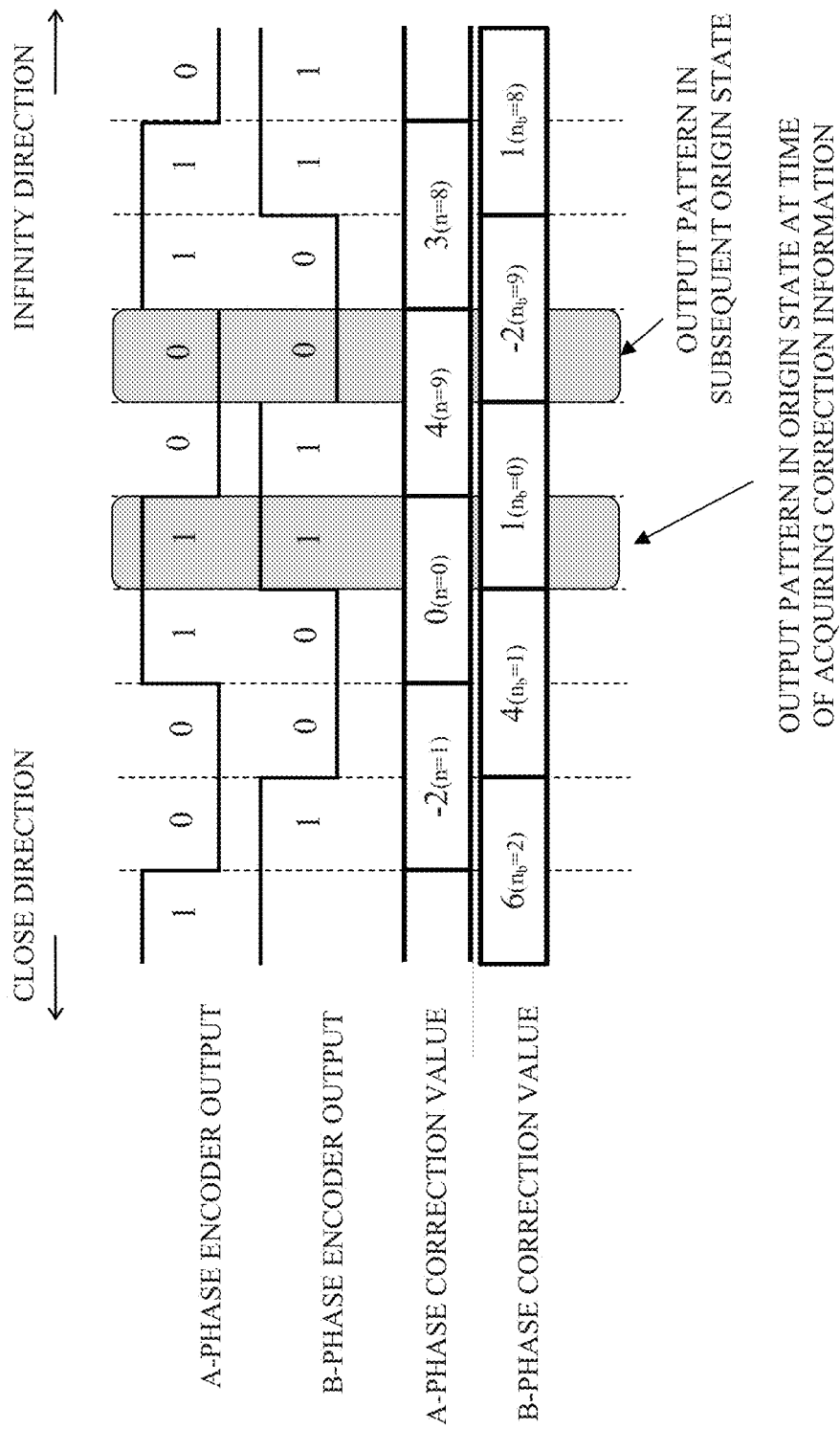
FIG. 8 is a diagram illustrating an output pattern of the encoder (Hall IC) in the embodiment.

Description will be made of a method of estimating the shift amount of the reference position due to the temperature change, with reference to an exemplary change of the encoder outputs illustrated in FIG. 8. FIG. 8 illustrates exemplary two-phase encoder outputs (an A-phase encoder output and a B-phase encoder output) and an A-phase correction value array and a B-phase correction value array containing correction values applied to edges of the A-phase encoder output and the B-phase encoder output, respectively. Each encoder output has binary values; an output value at the High level is represented by 1, and an output value at the Low level is represented by 0 in this description. Moreover, the A-phase encoder output is allocated to a higher bit and the B-phase encoder output is allocated to a lower bit, thereby the A- and B-phase encoder outputs are collectively written as a two-bit pattern (encoder output pattern) including the higher and lower bits. The figure only lists the correction values in a case of driving the motor 106a in the close direction.

In FIG. 8, when an encoder output pattern as the reference signal in the origin state at the time of acquiring the correction information (that is, at a time of detecting and storing the origin position of the focus lens 105) is $(11)_b$, a next encoder output pattern in the close direction is $(10)_b$, and another next pattern in the infinity direction is $(01)_b$. Therefore, a shift mount of 1/2 pole or smaller from the stored origin position can be estimated from the encoder output pattern.

For a shift amount of 1 pole from the stored origin position, the encoder output pattern is $(00)_b$ in either of the close and infinity directions. Thus, the shift amount cannot be estimated from the encoder output pattern. In this case, using the temperature-dependent property for a comparison result between a temperature (reference temperature) stored at the time of acquiring the correction information and a temperature measured (detected) at a time of subsequently detecting the origin position (in the origin state) enables estimation of the shift amount. As illustrated in FIG. 1, the temperature is measurable (detectable) with a temperature sensor 121 provided to the interchangeable lens 200 (or the camera 100).

For a shift amount of 3/2 poles from the stored origin position, the encoder output pattern is $(01)_b$ in the close direction, and $(10)_b$ in the infinity direction. Therefore the shift amount can be estimated from the encoder output pattern. Although the encoder output pattern is the same as that for the shift of 1/2 pole, the shift of 3/2 occurs only for a large temperature change. Thus, the comparison of the temperature is also performed to determine that the shift amount is 3/2 poles if their difference is larger than a predetermined threshold, and then the direction of the shift is estimated from the encoder output pattern.

As illustrated in FIG. 8, when the encoder output values at the origin position at the time of acquiring the correction information and at the origin position subsequently detected has the shift amount of 1 pole, a correction value to be applied to a first encoder output edge of the B phase at a time of driving in the close direction is not 1 but −2.

Although the present embodiment enables the correction of the encoder output for the shift amount of up to 3/2 poles, that for a shift amount larger than 3/2 poles can be achieved by using a magnitude of temperature difference in place of a magnitude of temperature.

Next, description will be made of a correction process (method) of correcting the encoder output in the present embodiment with reference to flowcharts in FIGS. 9 and 10. This correction process is executed by the lens IC 111 as a computer according a correction program that is a computer program.

Figure 9:
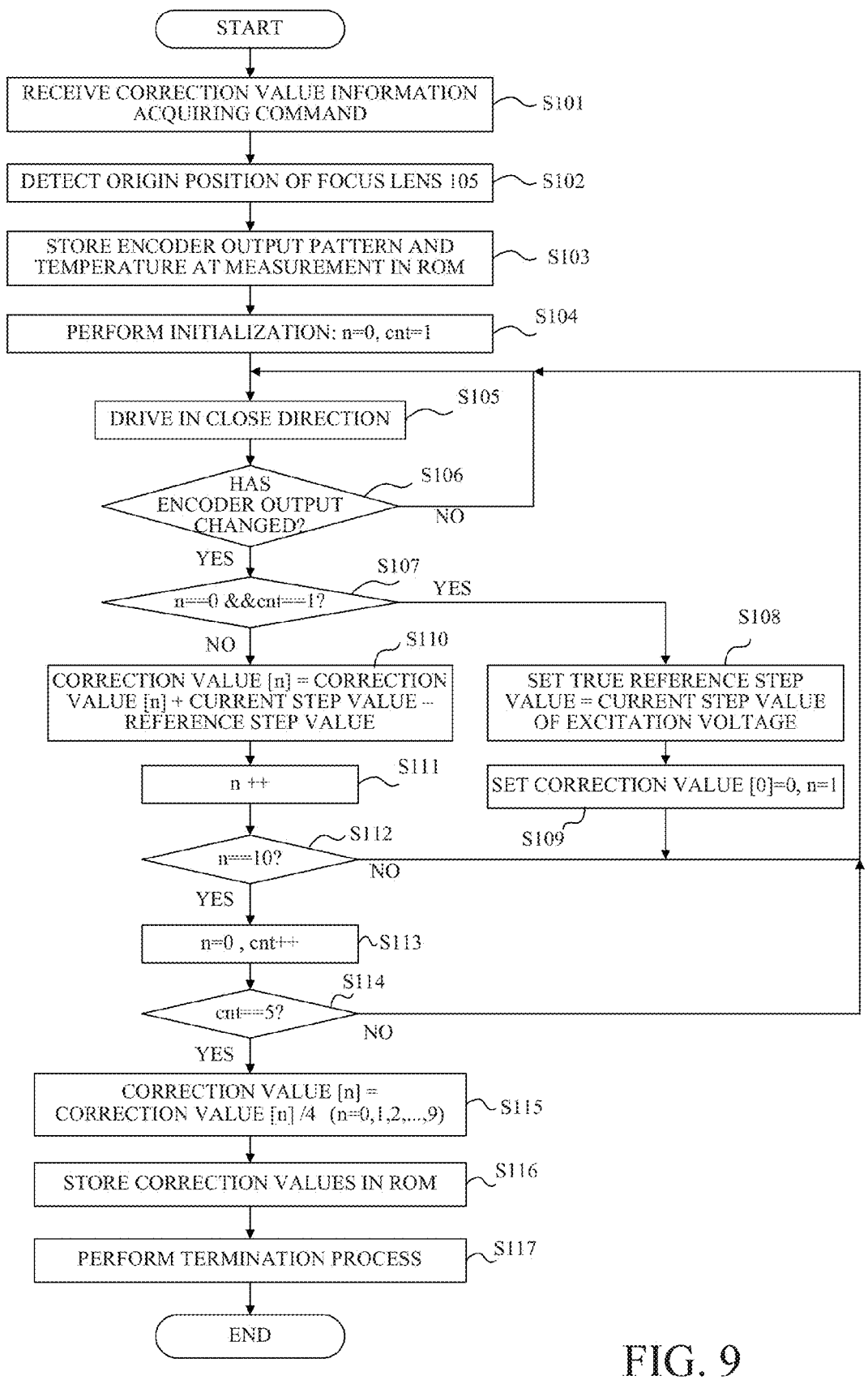
FIG. 9 is a flowchart illustrating an operation of acquiring correction information for the encoder magnet in the embodiment.

The flowchart in FIG. 9 illustrates, of the correction process, a process of acquiring the correction information. The process of acquiring the correction information is performed by using the rotational position of the encoder magnet 106c corresponding to the origin position of the focus lens 105 as the reference position and the encoder output at this rotational position as the reference signal. Moreover, this process of acquiring the correction information is performed at adjustment of the interchangeable lens 200 (that is, of the encoder 107) before its shipment from a factory where the interchangeable lens 200 is manufactured (that is, at factory adjustment). The process does not require the camera 100 as long as the interchangeable lens 200 is supplied with electrical power. The flowchart in FIG. 9 only illustrates the process of acquiring the correction information for the A-phase A output in the case of driving in the close direction.

At step S101, the lens IC 111 receives a correction value information acquiring command from an external terminal such as a personal computer. Having received the command, the lens IC 111 proceeds to step S102.

At step S102, the lens IC 111 drives the motor 106a to detect the origin position of the focus lens 105. As described above, the lens IC 111 sets a rotational position at a timing when the photo-interrupter 106h changes from the light-transmissive state to the light-shielding state as the origin position, and stops the drive of the motor 106a. After detecting the origin position, the lens IC 111 proceeds to step S103. Although not illustrated, a failure to detect the origin position causes the lens IC 111 to conclude that the origin detection mechanism has a failure and to stop performing subsequent processes.

At step S103, the lens IC 111 stores, to the ROM 111a, the encoder output pattern, which is a combination of the A- and B-phase encoder outputs, at the origin position and a current temperature. Then, the lens IC 111 proceeds to step S104.

At step S104, the lens IC 111 performs an initialization process to acquire the correction values. In the following description, n represents a number (ordinal number) of each correction value (that is, of each magnetized portion of the encoder magnet 106c) in the A-phase correction value array, and an n-th correction value is represented as a correction value [n]. In addition, cnt represents a counted value as the number of rotations of the encoder magnet 106c at the time of acquiring the correction value (correction information). In the present embodiment, the correction value is acquired multiple times for each rotational position of the encoder magnet 106c, and an averaged value of the multiple correction values for that rotational position is used as the correction value to be applied. This acquisition method enables use of the correction value robust against noise. In the present embodiment, since the correction value is acquired four times for each rotational position, the rotation number counter cnt takes a value of 1 to 4. Having finished the initialization, the lens IC 111 proceeds to step S105.

At step S105, the lens IC 111 drives the motor 106a in the close direction. The lens IC 111A sets a drive speed such that no torque ripple is generated and drives the motor 106a under an open-loop control in which the output of the encoder magnet 106c does not affect the drive speed. Only when having proceeded from step S104 to step S105, the lens IC 111 proceeds to step S106 at a timing when the drive speed becomes stable and the rotational position is located at a position identical to the origin position. When having proceeded from other steps, the lens IC 111 proceeds to step S106 at each production of the excitation waveform. This process is to correspond a correction value [0] with the origin position.

At step S106, the lens IC 111 determines whether or not the encoder output has changed. If the encoder output has changed, the lens IC 111 proceeds to step S107. If the encoder output has not changed, the lens IC 111 proceeds to step S105.

At step S107, the lens IC 111 determines whether or not an edge of the encoder output serving as the reference signal has been output. Specifically, the lens IC 111 determines whether or not n=0 and cnt=1 are satisfied. If n=0 and cnt=1 are satisfied, the lens IC 111 proceeds to step S108. When n=0 and cnt=1 are not satisfied, the lens IC 111 proceeds to step S110.

At step S108, the lens IC 111 sets a step value of the excitation voltage corresponding to the current edge of the encoder output, as a true reference step value. With the true reference step as a reference, the lens IC 111 then decides a reference step value of the A-phase encoder output and a reference step value of the B-phase encoder output. When the true reference step value is 128 for example, the reference step value is 128 for even n and 628 for odd n, and a difference between the reference step value and a step value when the encoder output changes is set as the correction value. For the B phase, with the true reference step value of 128, the reference step value is 878 for even n and 378 for odd n. Having decided the reference steps, the lens IC 111 proceeds to step S109.

At step S109, the lens IC 111 substitutes 0 into the correction value [0] and sets the correction value number n to 1. After the setting, the lens IC 111 proceeds to step S105.

At step S110, the lens IC 111 accumulates the (n-th) correction value for the correction value number n. The correction value accumulated is a difference between the step value of the current excitation voltage and the reference step value. Having accumulated the correction value, the lens IC 111 proceeds to step S111.

At step S111, the lens IC 111 increments the correction value number n. As long as the motor 106a drives continuously in one direction, a rotational position corresponding to a next encoder output is always a pole next to a current pole. After this process, the lens IC 111 proceeds to step S112.

At step S112, the lens IC 111 determines whether or not the correction value number n is 10. If the correction value number n is 10, the lens IC 111 proceeds to step S113. If the correction value number n is not 10, the lens IC 111 proceeds to step S105.

At step S113, because of determination that the encoder magnet 106c has rotated once, the lens IC 111 initializes the correction value number n to 0 and increments the rotation number counter cnt. After finishing this process, the lens IC 111 proceeds to step S114.

At step S114, the lens IC 111 determines whether or not the rotation number counter cnt is 5, that is, whether or not the encoder magnet 106c has rotated four times after starting the acquisition of the correction values. If the encoder magnet 106c has rotated four times, the lens IC 111 proceeds to step S115. If the encoder magnet 106c has not rotated four times, the lens IC 111 returns to step S105.

At step S115, the lens IC 111 calculates the average value of the correction values. Specifically, the lens IC 111 calculates the averaged value of each correction value [n] (n=0, 1, 2, . . . , 9) acquired by accumulation of four times to determine the correction value for each rotational position of the encoder magnet 106c. After this step, the lens IC 111 proceeds to step S116.

At step S116, the lens IC 111 stores the correction values calculated at step S115 in the ROM 111a. After this process, the lens IC 111 proceeds to step S117.

At step S117, in response to a completion of the acquisition of the correction information, the lens IC 111 performs a termination process. In the termination process, the lens IC 111 moves the focus lens 105 back to the origin position, keeps energization to the motor 106a at the origin position for a predetermined time period and then terminates the energization. In addition, the lens IC 111 clears the set drive speed and variables such as the correction value number n and the rotation number counter cnt. After finishing the termination process, the lens IC 111 finishes the process of acquiring the correction information.

In the process of acquiring the correction information described above, when a load differs significantly depending on a drive position of the focus lens 105, it is desirable to perform an outlier detection before the averaging process and remove data corresponding to a significantly different load. When acquiring the correction values for the infinity direction, the lens IC 111 sets, in order to correspond the correction value number n with the close direction, an initial value (n) thereof to 9, decrements the correction value number n at step S111 and then determines whether or not the correction value number n is −1 at S112. The reference step value at step S108 needs to be set separately from that for the drive in the close direction.

Figure 10A:
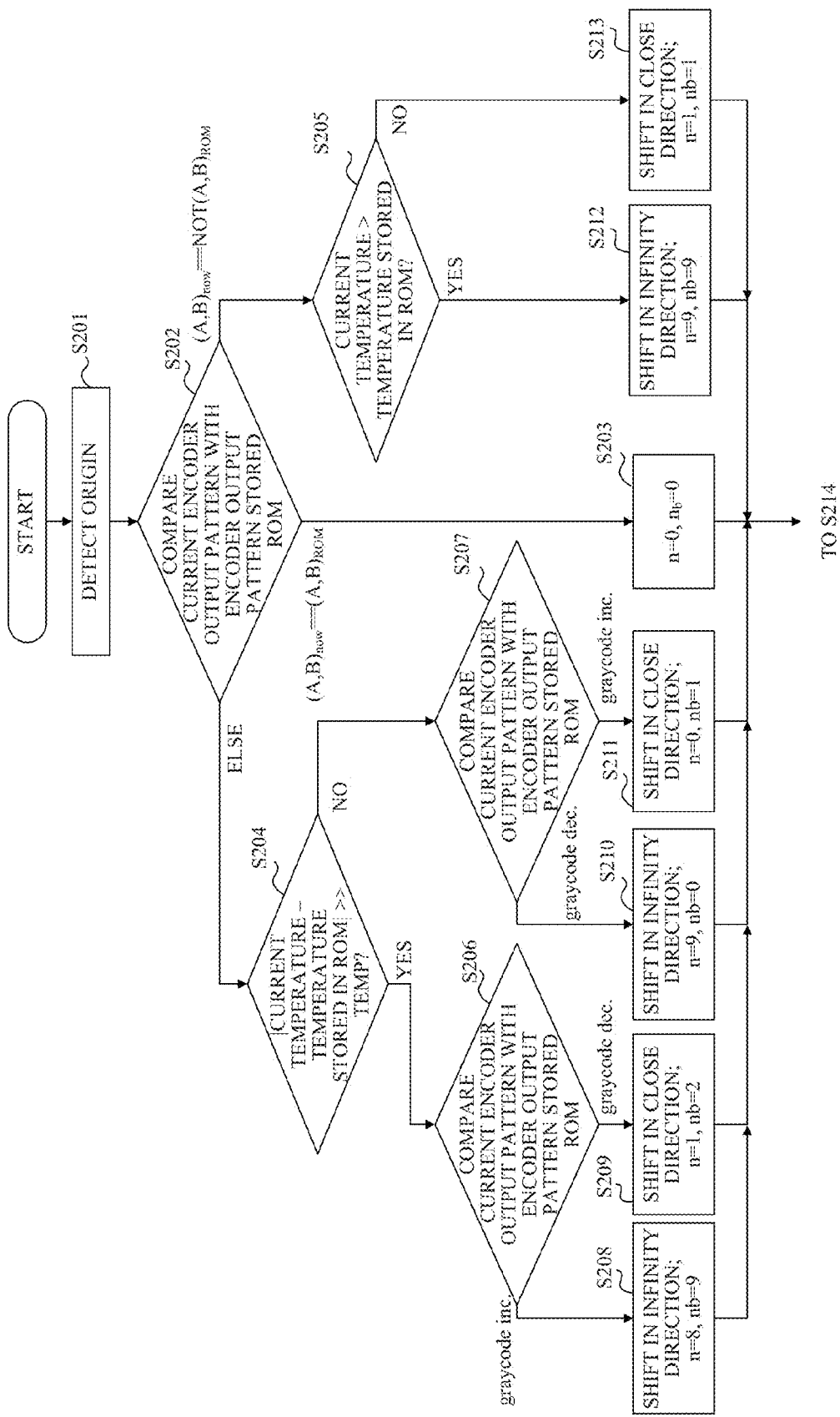
FIGS. 10A and 10B are flowcharts illustrating an operation of controlling the focus lens in the embodiment.
Figure 10B:
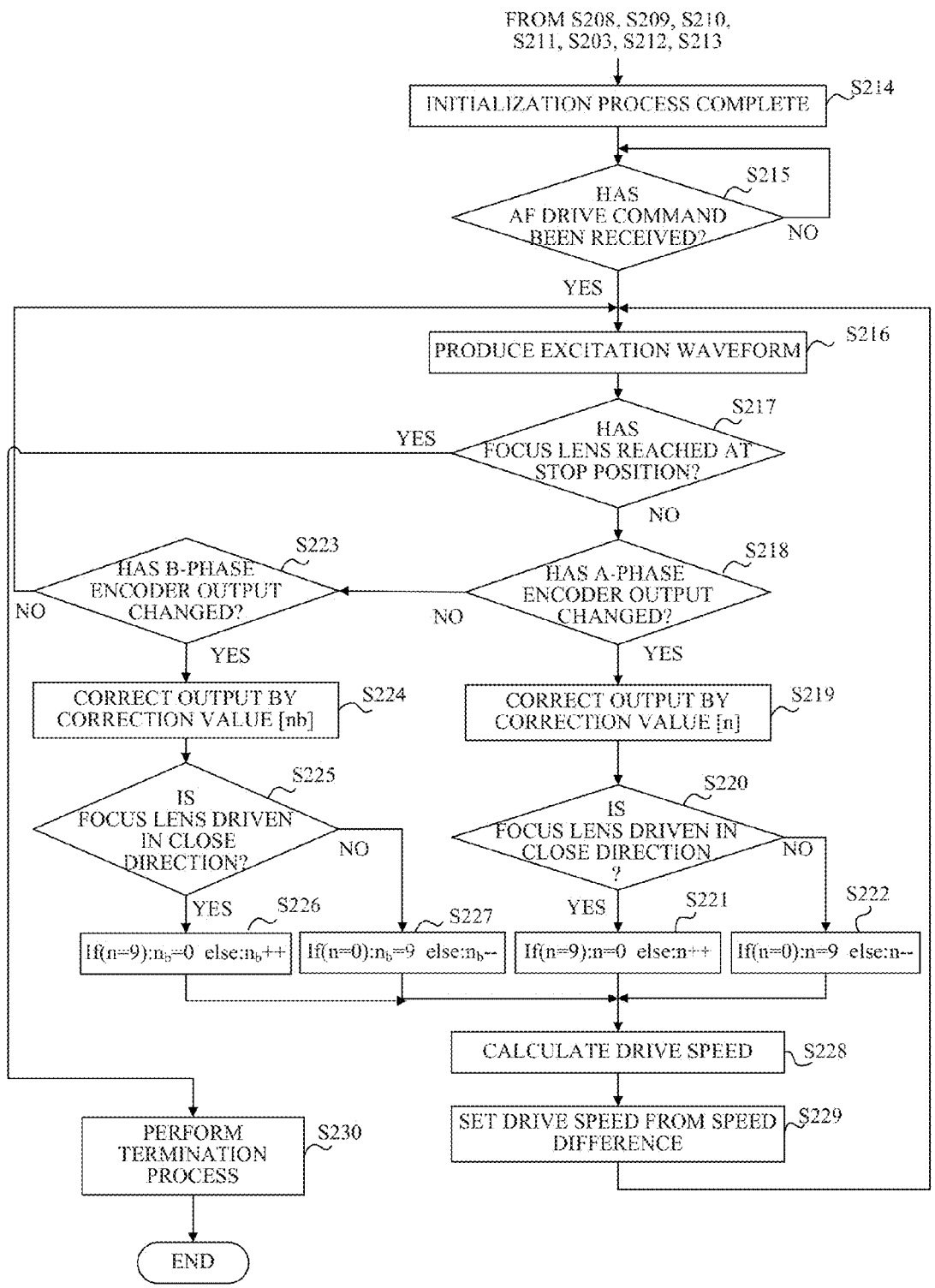

The flowcharts in FIGS. 10A and 10B illustrate a control operation of the lens IC 111 to control the drive of the focus lens 105. The lens IC 111 drives the focus lens 105 so as to perform the AF in response to the AF drive command received from the camera IC 118, to perform zoom tracking in response to the user's operation of the zoom ring and to perform manual focus in response to the user's operation of the manual focus ring.

The lens IC 111 starts an operation below in response to attachment of the interchangeable lens 200 to the camera 100 or a release of a sleep mode of the camera 100 to which the interchangeable lens 200 is attached. At steps S201 to S214, the lens IC 111 resets the focus lens 105. At steps S215 to S225, the lens IC 111 performs drive processes to drive the focus lens 105 in response to the AF drive command from the camera IC 118, the zoom ring operation and the manual focus ring operation.

Description will be made of a case where the encoder output pattern in the origin state of the focus lens 105 stored in the ROM 111*a* is the same as that illustrated in FIG. 8. When the origin position of the focus lens 105 is shifted by 1/2 pole to an adjacent position to the origin position stored at the time of acquiring the correction information in FIG. 8, initial values of correction value numbers n and nb set at steps S208 to S213 are different from each other; n represents the correction value number for the A-phase encoder output (hereinafter referred to as "an A-phase correction value number") and nb represents the correction value number for the B-phase encoder output (hereinafter referred to as "a B-phase correction value number").

At step S201, the lens IC 111 performs the reset operation so as to detect the origin position of the focus lens 105. A focus mechanism of the present embodiment has no means for encoding an absolute value of the position of the focus lens 105. For this reason, the light-shielding wall portion 106*g* and the photo-interrupter 106*h* are used to define the origin position, and the number of applied pulses to the motor 106*a* during movement from the origin position are used to acquire a relative position of the focus lens 105. Although the lens IC 111 performs a feedback control in the reset operation, since the correction values are not corresponded with the rotational positions of the encoder magnet 106*c*, the lens IC 111 calculates an average value of 10 correction values for each of the A- and B-phases to apply a single correction value (averaged value) to each of the A- and B-phase encoder outputs.

However, in a case where dispersion of the correction values is larger than a predetermined threshold, the lens IC 111 performs the feedback control without using the correction values (that is, without correcting the A- and B-phase encoder outputs) or performs an open-loop control. The reason for performing the feedback control involving the correction process in a state where the origin position is not defined is to enable performing the reset operation in a shorter time. After detecting the origin position, the lens IC 111 proceeds to step S202.

At step S202, the lens IC 111 compares an encoder output pattern $(A,B)_{now}$ now detected at step S201 with the encoder output pattern $(A,B)_{ROM}$ at the time of acquiring the correction information stored in the ROM 111*a* at step S103. If the encoder output pattern $(A,B)_{now}$ is equal to the encoder output pattern $(A,B)_{ROM}$, since no change of the origin position at the current time from the origin position at the time of acquiring the correction information, the lens IC 111 proceeds to step S203. If the encoder output pattern $-(A,B)_{now}$ is equal to the encoder output pattern $(A,B)_{ROM}$, the lens IC 111 determines that the origin position is shifted by one pole of the encoder magnet 106*c* and then proceeds to step S205. In cases other than these cases, the lens IC 111 determines that the origin position is shifted by 1/2 or 3/2 poles of the encoder magnet 106*c* and then proceeds to step S204.

At step S203, the lens IC 111 sets the correction value number n to 0. Since no difference exists between the origin position stored in the ROM 111*a* at step S103 and the origin position detected at step S201, the lens IC 111 sets the correction value number n corresponding to the origin position stored in the ROM 111*a* as the initial value of the correction value number. After finishing this step, the lens IC 111 proceeds to step S214.

At step S204, the lens IC 111 determines whether the current origin position is shifted with respect to the origin position at the time of acquiring the correction information stored in the ROM 111*a* by 1/2 or 3/2 poles. Specifically, the lens IC 111 compares a current temperature with a temperature at the time of acquiring the correction information stored in the ROM 111*a* at step S103. If these temperatures have a difference equal to or larger than a predetermined temperature, the lens IC 111 determines that the shift amount is 3/2 poles and proceeds to step S206. If the above temperatures have a difference smaller than the predetermined temperature, the lens IC 111 determines that the shift amount is 1/2 pole and proceeds to step S207. As illustrated in FIG. 7, a larger temperature difference tends to lead to a larger shift amount of the origin position, which validates the determination at this step.

At step S205, the lens IC 111 compares the current temperature with the temperature at the time of acquiring the correction information stored in the ROM 111*a* at step S103 and determines a direction of the shift of the origin position. If the current temperature is higher than the other, the lens IC 111 determines that the origin position is shifted to the infinity direction and then proceeds to step S212. If the current temperature is not higher than the other, the lens IC 111 determines that the origin position is shifted to the close direction and then proceeds to step S213. The determination at this step is based on a tendency that the origin position is shifted more largely to the infinity direction at higher temperature as illustrated in FIG. 7.

At step S206, the lens IC 111 compares, as in the comparison at step S202, the encoder output pattern corresponding to the current origin position with the encoder output pattern corresponding to the origin position at the time of acquiring the correction information stored in the ROM 111*a*. The lens IC 111 has determined that the origin position is shifted by 3/2 poles at step S204, so that the lens IC 111 performs the comparison at this step so as to determine the direction of the shift.

Figure 11:
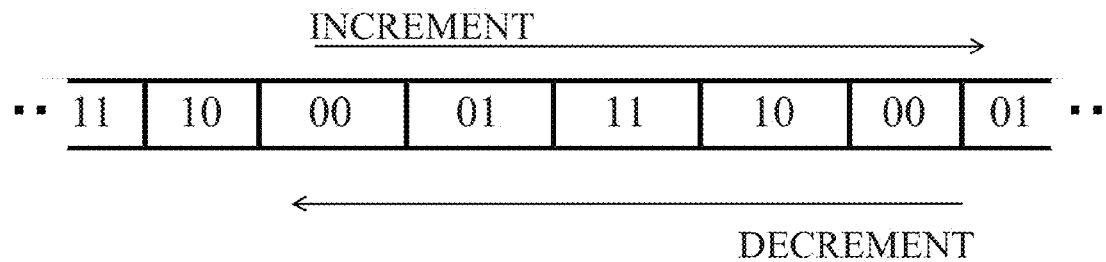
FIG. 11 is a conceptual diagram illustrating a gray code used in the embodiment.

The determination at this step is performed by using a Gray code (reflected binary code). The Gray code has a property that a Hamming distance between any two adjacent codes is always 1. In the present embodiment, the gray code is applied to the encoder output pattern. FIG. 11 schematically illustrates a 2-bit gray code. Directions of arrows in FIG. 11 respectively define an increment direction and a decrement direction. If the current encoder output pattern is in the increment direction of the gray code with respect to the encoder output pattern in the correction information, the lens IC 111 determines that the origin position is shifted to the infinity direction and then proceeds to step S208. If the current encoder output pattern is in the decrement direction, the lens IC 111 determines that the origin position is shifted to the close direction and then proceeds to step S209.

At step S207, the lens IC 111 compares, as in the comparison at step S202, the encoder output pattern corresponding to the current origin position with the encoder output pattern corresponding to the origin position stored in the ROM 111*a*. The lens IC 111 has determined that the shift is of 1/2 pole at step S204 as described above, so that the lens IC 111 performs the comparison at this step so as to determine the direction of the shift. The comparison is also performed by using the gray code as at step S206. If the current encoder output pattern is in the increment direction of the gray code with respect to the encoder output pattern in the correction information, the lens IC 111 determines that the origin position is shifted to the close direction and then proceeds to step S210. If the current encoder output pattern is in the decrement direction, the lens IC 111 determines that the origin position is shifted to the infinity direction and then proceeds to step S211.

At step S208, since the current origin position is shifted with respect to the origin position at the time of acquiring the correction information by 3/2 poles in the infinity direction, the lens IC 111 sets the A-phase correction value number n to 8 and the B-phase correction value number nb to 9. Thereafter, the lens IC 111 proceeds to step S214.

At step S209, since the current origin position is shifted with respect to the origin position at the time of acquiring the correction information by 3/2 poles in the close direction, the lens IC 111 sets the A-phase correction value number n to 1 and the B-phase correction value number nb to 2. Thereafter, the lens IC 111 proceeds to step S214.

At step S210, since the current origin position is shifted with respect to the origin position at the time of acquiring the correction information by 1/2 pole in the infinity direction, the lens IC 111 sets the A-phase correction value number n to 9 and the B-phase correction value number nb to 0. Thereafter, the lens IC 111 proceeds to step S214.

At step S211, since the current origin position is shifted with respect to the origin position at the time of acquiring the correction information by 1/2 pole in the close direction, the lens IC 111 sets the A-phase correction value number n to 0 and the B-phase correction value number nb to 1. Thereafter, the lens IC 111 proceeds to step S214.

At step S212, since the current origin position is shifted with respect to the origin position at the time of acquiring the correction information by 1 pole in the infinity direction, the lens IC 111 sets the A-phase correction value number n to 9 and the B-phase correction value number nb to 9. Thereafter, the lens IC 111 proceeds to step S214.

At step S213, since the current origin position is shifted with respect to the origin position at the time of acquiring the correction information by 1 pole in the close direction, the lens IC 111 sets the A-phase correction value number n to 1 and the B-phase correction value number nb to 1. Thereafter, the lens IC 111 proceeds to step S214.

At step S214, the lens IC 111 notifies the camera IC 118 that the reset operation and the correction of the shifted origin position of the focus lens 105 have completed and image capturing is possible.

Although the present embodiment described that the reference position correction based on temperature is performed by using the temperature-dependant property illustrated in FIG. 7, any temperature-dependant property other than that illustrated in FIG. 7 may also be used.

Next at step S215, the lens IC 111 waits until receiving the AF drive command from the camera IC 118 or waits for the zoom operation and the manual focus operation. In response to the reception of the AF drive command, or the zoom operation and the manual focus operation, the lens IC 111 proceeds to step S216.

At step S216, the lens IC 111 causes the motor driver 106*d* to produce the excitation waveform for exciting the motor 106*a* and to drive the motor 106*a*. The motor driver 106*d* produces, in units of step, an excitation waveform according to a drive speed and a power rate provided from the lens IC 111. The lens IC 111 sets acceleration and deceleration and causes the motor driver 106*d* to produce an excitation waveform for starting the deceleration when the focus lens 105 is moved close to its target stop position. After driving the focus lens 105 for one step value at this step, the lens IC 111 proceeds to step S217.

At step S217, the lens IC 111 performs a stop position determination. Specifically, the lens IC 111 determines whether or not the focus lens 105 whose drive has been started at step S216 has reached at the target stop position. If the focus lens 105 has reached at the target stop position, the lens IC 111 proceeds to step S230. If the focus lens 105 has not reached at the target stop position, the lens IC 111 proceeds to step S218.

At step S218, the lens IC 111 determines whether or not the A-phase encoder output has changed. If the A-phase encoder output has changed, the lens IC 111 proceeds to step S219. If the A-phase encoder output has not changed, the lens IC 111 proceeds to step S223. Since a control cycle in the present embodiment starts at every change in the encoder output, the lens IC 111 calculates the drive speed of the motor 106*a* at each change timing of the encoder output and updates feedback information.

At step S219, the lens IC 111 applies the correction value [n] to a step value of the excitation waveform when detecting an edge of the A-phase encoder output. In other words, the lens IC 111 corrects the A-phase encoder output by using the correction value [n]. This correction prevents a shift of the edge of the A-phase encoder output due to a shift of a magnetization pitch of the encoder magnet 106*c* from affecting a feedback control system. After correcting the A-phase encoder output, the lens IC 111 proceeds to step S220.

At step S220, the lens IC 111 determines whether or not the focus lens 105 is driven in the close direction. If the focus lens 105 is driven in the close direction, the lens IC 111 proceeds to step S221. If the focus lens 105 is driven not in the close direction (but in the infinity direction), the lens IC 111 proceeds to step S222.

At step S221, the lens IC 111 updates (increments) the A-phase correction value number n for the drive of the focus lens 105 in the close direction. The lens IC 111 sets a new A-phase correction value number n to 0 in a case where a previous A-phase correction value number n is 9 and increments the correction value number n by one in other cases. After this step, the lens IC 111 proceeds to step S228.

At step S222, the lens IC 111 updates (decrements) the A-phase correction value number n for the drive of the focus lens 105 in the infinity direction. Specifically, the lens IC 111 sets a new A-phase correction value number n to 9 in a case where a previous A-phase correction value number n is 0 and decrements the correction value number n by one in other cases. After this step, the lens IC 111 proceeds to step S228.

At step S223, the lens IC 111 determines whether or not the B-phase encoder output has changed. If the phase B encoder output has changed, the lens IC 111 proceeds to step S224. If the B-phase encoder output has not changed, the lens IC 111 proceeds to step S216.

At step S224, the lens IC 111 applies the correction value [nb] to a step value of the excitation waveform when detecting an edge of the B-phase encoder output. In other words, the lens IC 111 corrects the B-phase encoder output by using the correction value [nb]. This correction prevents a shift of the edge of the B-phase encoder output due to the shift of the magnetization pitch of the encoder magnet 106*c* from affecting the feedback control system. After correcting the B-phase encoder output, the lens IC 111 proceeds to step S225.

At step S225, the lens IC 111 determines whether or not the focus lens 105 is driven in the close direction. If the focus lens 105 is driven in the close direction, the lens IC 111 proceeds to step S226. If the focus lens 105 is driven not in the close direction (but in the infinity direction), the lens IC 111 proceeds to step S227.

At step S226, the lens IC 111 updates (increments) the B-phase correction value number nb for the drive of the focus lens 105 in the close direction. The lens IC 111 sets a new B-phase correction value number nb to 0 in a case where a previous B-phase correction value number nb is 9 and increments the B-phase correction value number nb by one in other cases. After this step, the lens IC 111 proceeds to step S228.

At step S227, the lens IC 111 updates (decrements) the B-phase correction value number nb for the drive of the focus lens 105 in the infinity direction. Specifically, the lens IC 111 sets a new B-phase correction value number nb to 9 in a case where a previous B-phase correction value number nb is 0 and decrements the number nb by one in other cases. After this step, the lens IC 111 proceeds to step S228.

At step S228, the lens IC 111 calculates a period on a basis of an edge interval of the encoder output corrected at steps 5219 to 5224 and calculates the drive speed of the stepping motor 106a. After calculating the drive speed, the lens IC 111 proceeds to step S229.

At step S229, the lens IC 111 calculates a speed difference between the drive speed calculated at step S228 and a target drive speed to set the drive speed of the motor 106a on a basis of the speed difference. After this step, the lens IC 111 returns to step S216 and reflects the drive speed thus set onto the excitation waveform produced by the motor driver 106d.

At step S230, since the focus lens 105 has reached at the target stop position, the lens IC 111 performs a focus drive termination process. Specifically, the lens IC 111 keeps energization to the motor 106a at the target stop position for a predetermined time period and then terminates the energization. In addition, the lens IC 111 clears set variables. However, the lens IC 111 holds the correction value numbers n and nb. This completes the operation of controlling the drive of the focus lens 105.

As described above, the rotation detection apparatus (lens IC 111) of the present embodiment previously stores the correction value for correcting the error in the relation between the rotational positions of the encoder magnet 106c and the edges of the encoder output, the error which is caused by the arrangement error of the magnetized portions of the encoder magnet 106c, to the ROM 111a for each of the magnetized portions (for each edge). Moreover, the rotation detection apparatus sets the rotational position of the encoder magnet 106c in the origin state in which the focus lens 105 driven by the motor 106a is located at the origin position as the reference position. Then, the rotation detection apparatus performs the correction of the error, at each of the edges of the encoder output in rotation of the encoder magnet 106c with respect to the reference position, by sequentially using the correction values corresponding to the edges. This correction enables, even though there is the arrangement error in the magnetized portions of the encoder magnet 106c, a highly accurate detection of the rotational position and rotational speed of the motor 106a. The use of the encoder outputs thus corrected enables a highly accurate feedback control of the rotational position, rotational speed and the like of the motor 106a, thereby enabling a highly accurate control of the drive position and drive speed of the focus lens 105.

Moreover, in the present embodiment the reference position of the encoder magnet 106c is set with reference to the origin position for detecting the position of the focus lens 105, which requires no additional member for setting the reference position. This setting enables improving control accuracy without increasing cost.

Figure 12:
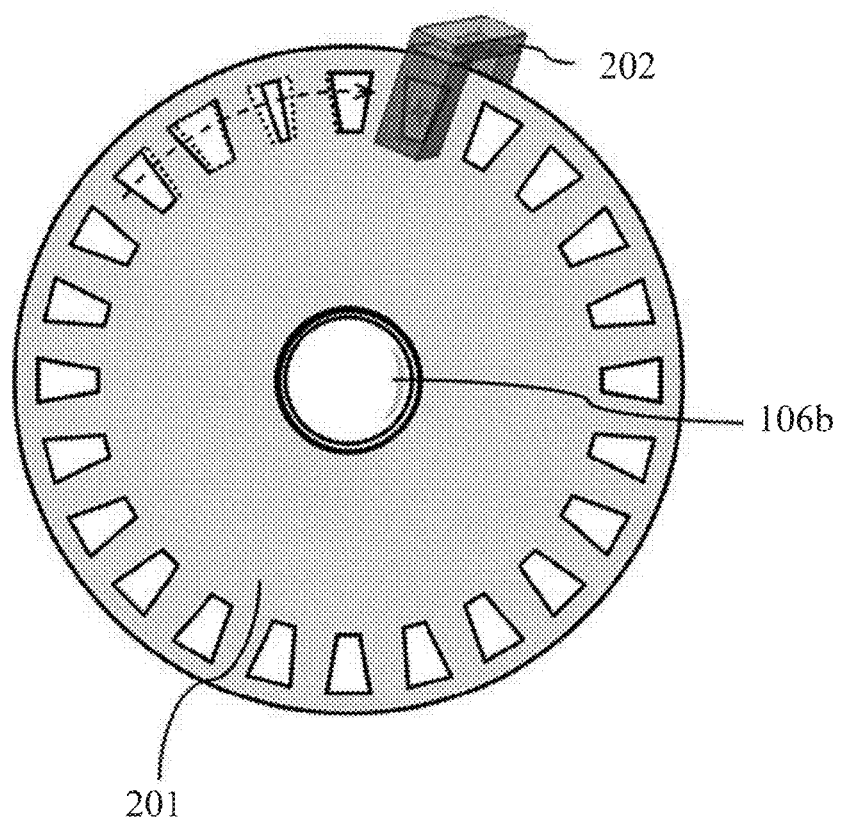
FIG. 12 is a diagram illustrating a configuration of an optical rotary encoder that is a modified example of the embodiment.

Furthermore, the encoder is not limited to a magnetic encoder as that in the present embodiment and may be an optical encoder constituted by a photo sensor and an optical member (rotatable member) provided with a rotation detection pattern including reflective and non-light reflective portions, or light-transmissive and non-light transmissive (light-shielding) portions, serving as pattern element portions. The photo sensor includes a light-emitting portion and a light-receiving portion. Light entering from the light-emitting portion via the light-transmissive portion or the light-reflective portion is detected by the light-receiving portion. FIG. 12 illustrates an example of a configuration of the optical encoder. The lead screw 106b illustrated in FIG. 2 is attached to a rotatable plate 201 in which the light-transmissive portions and the non-light-transmissive portions are alternately disposed in its rotational direction. The rotatable plate 201 is disposed rotatably in between the light-emitting portion and the light-receiving portion provided in a photo-interrupter 202.

In a case of using such an optical encoder, applying the correction process described in the embodiment enables removing influence due to manufacturing errors such as size variation of holes serving as the multiple light-transmissive portions formed in the rotatable plate 201 and an eccentric error thereof.

In addition, an encoder to which the correction process described in the embodiment is applicable is desirably a magnetic encoder having an equal pitch of N- and S-pole magnetized portions or an optical encoder having an equal pitch of light-transmissive portions and an equal pitch of non-light-transmissive portions. However, these portions may not necessarily be arranged with an equal pitch as long as are arranged regularly.

Furthermore, the embodiment described the case of estimating the shift amount between the origin position of the focus lens 105 stored at the time of acquiring the correction information and the origin position thereof detected thereafter, by using the encoder output pattern and temperature. However, in addition thereto, an attitude of the focus lens 105 (that is, of the interchangeable lens 200 and the camera 100) may be detected. Reflecting a result of the detection on the estimation of the shift amount of the origin position enables estimation with a higher accuracy.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-149987, filed Jul. 19, 2013, which is hereby incorporated by reference herein in its entirety.

What is claimed is:

1. A rotation detection apparatus comprising:
   a rotatable member rotatable with rotation of a motor and provided in its rotational direction with multiple pattern element portions forming a pattern for rotation detection;
   a signal outputter configured to output a detection signal changing in response to rotation of the pattern element portions with rotation of the rotatable member;
   a memory storing multiple correction values each provided for each of the pattern element portions and used to perform correction of an error in a relation between rotational positions of the rotatable member and the change of the detection signal, the error being caused by an arrangement error of the pattern element portions on the rotatable member; and
   a corrector configured to perform the correction with reference to a reference position that is one rotational position of the rotatable member in an origin state where a driven member driven by the motor is located at its origin position, and by using each of the correction values for each change of the detection signal when the rotatable member is rotated from the reference position.

2. A rotation detection apparatus according to claim 1, wherein the corrector is configured to store the detection signal in the origin state as a reference signal and to correct the reference position on a basis of a difference between the reference signal and the detection signal output in the origin state after storing of the reference signal.

3. A rotation detection apparatus according to claim 1, wherein the corrector is configured to store a temperature detected in the origin state as a reference temperature and to correct the reference position on a basis of a difference between the reference temperature and another temperature detected in the origin state after storing of the reference temperature.

4. A rotation detection apparatus according to claim 1, wherein the corrector is configured to not perform the correction or to perform the correction by using an average value of the correction values when the driven member is driven toward the origin position.

5. A rotation detection apparatus according to claim 1, wherein the rotatable member is a magnet in which an S-pole magnetized portion and an N-pole magnetized portion, which are the pattern element portions, are arranged alternately in the rotational direction, and
   the signal outputter is a magnetic detection element which outputs the detection signal changing in response to change in a magnetic flux density due to rotation of the S- and N-pole magnetized portions with the rotation of the rotatable member.

6. A rotation detection apparatus according to claim 1, wherein the rotatable member is an optical member in which (a) a light-transmissive portion and a non-light-transmissive portion or (b) a light-reflective portion and a non-light-reflective portion, which are the pattern element portions, are arranged alternately in the rotational direction, and
   the signal outputter includes a light-emitting portion and a light-receiving portion which detects light entering from the light emitting portion via the light-transmissive portion or the light-reflective portion.

7. A rotation detection apparatus according to claim 1, wherein the correction values are provided at factory adjustment of the apparatus.

8. A motor control apparatus comprising:
   a rotation detection apparatus; and
   a controller,
   wherein the rotation detection apparatus comprises:
   a rotatable member rotatable with rotation of a motor and provided in its rotational direction with multiple pattern element portions forming a pattern for rotation detection;
   a signal outputter configured to output a detection signal changing in response to rotation of the pattern element portions with rotation of the rotatable member;
   a memory storing multiple correction values each provided for each of the pattern element portions and used to perform correction of an error in a relation between rotational positions of the rotatable member and the change of the detection signal, the error being caused by an arrangement error of the pattern element portions on the rotatable member; and
   a corrector configured to perform the correction with reference to a reference position that is one rotational position of the rotatable member in an origin state where a driven member driven by the motor is located at its origin position, and by using each of the correction values for each change of the detection signal when the rotatable member is rotated from the reference position, and
   wherein the controller is configured to control drive of the motor by using the detection signal after being corrected by the corrector.

9. A motor driven apparatus comprising:
   a motor;
   a driven member to be driven by the motor;
   an origin detector configured to detect an origin position of the driven member; and
   a motor control apparatus,
     wherein the motor control apparatus comprises:
   a rotation detection apparatus; and
   a controller,
   wherein the rotation detection apparatus comprises:
   a rotatable member rotatable with rotation of the motor and provided in its rotational direction with multiple pattern element portions forming a pattern for rotation detection;
   a signal outputter configured to output a detection signal changing in response to rotation of the pattern element portions with rotation of the rotatable member;
   a memory storing multiple correction values each provided for each of the pattern element portions and used to perform correction of an error in a relation between rotational positions of the rotatable member and the change of the detection signal, the error being caused by an arrangement error of the pattern element portions on the rotatable member; and
   a corrector configured to perform the correction with reference to a reference position that is one rotational position of the rotatable member in an origin state where a driven member driven by the motor is located at its origin position, and by using each of the correction values for each change of the detection signal when the rotatable member is rotated from the reference position, and
   wherein the controller is configured to control drive of the motor by using the detection signal after being corrected by the corrector.

10. A motor driven apparatus according to claim 9, wherein the driven member is an optical element used for image capturing.

11. A method of correcting a rotation detection apparatus, the apparatus includes a rotatable member rotatable with rotation of a motor and provided in its rotational direction with multiple pattern element portions forming a pattern for rotation detection, the method comprising:
  providing multiple correction values each provided for each of the pattern element portions; and
  performing, by using the correction values, correction of an error in a relation between rotational positions of the rotatable member and change of a detection signal which is output and changes in response to rotation of the pattern element portions with rotation of the rotatable member, the error being caused by an arrangement error of the pattern element portions on the rotatable member,
  wherein the method performs the correction with reference to a reference position that is one rotational position of the rotatable member in an origin state where a driven member driven by the motor is located at its origin position, and by using each of the correction values for each change of the detection signal when the rotatable member is rotated from the reference position.

12. A non-transitory computer-readable storage medium storing a correction program as a computer program to cause a computer provided in a rotation detection apparatus to perform a correction process, the rotation detection apparatus including a rotatable member which is rotatable with rotation of a motor and is provided in its rotational direction with multiple pattern element portions forming a pattern for rotation detection, the correction process comprising:
  providing multiple correction values each provided for each of the pattern element portions; and
  performing, by using the correction values, correction of an error in a relation between rotational positions of the rotatable member and change of a detection signal which is output and changes in response to rotation of the pattern element portions with rotation of the rotatable member, the error being caused by an arrangement error of the pattern element portions on the rotatable member,
  wherein the correction process performs the correction with reference to a reference position that is one rotational position of the rotatable member in an origin state where a driven member driven by the motor is located at its origin position, and by using each of the correction values for each change of the detection signal when the rotatable member is rotated from the reference position.

* * * * *